US010900587B2

(12) United States Patent
Cis et al.

(10) Patent No.: US 10,900,587 B2
(45) Date of Patent: Jan. 26, 2021

(54) VALVES

(71) Applicant: Hamilton Sundstrand Corporation, Charlotte, NC (US)

(72) Inventors: Marcin Cis, Lutynia (PL); Piotr Sawicki, Bogdaniec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 22 days.

(21) Appl. No.: 16/262,006

(22) Filed: Jan. 30, 2019

(65) Prior Publication Data

US 2019/0301632 A1 Oct. 3, 2019

(30) Foreign Application Priority Data

Mar. 29, 2018 (EP) ..................... 18461542

(51) Int. Cl.
| | |
|---|---|
| *F15B 15/26* | (2006.01) |
| *F16K 27/04* | (2006.01) |
| *F16K 31/126* | (2006.01) |

(52) U.S. Cl.
CPC ........ *F16K 31/1262* (2013.01); *F16K 27/041* (2013.01)

(58) Field of Classification Search
CPC .. F15B 15/26; F15B 15/265; F15B 2015/267; F16K 27/041
USPC .................. 137/233, 315.07, 315.09, 315.27
See application file for complete search history.

(56) References Cited

U.S. PATENT DOCUMENTS

| | | | |
|---|---|---|---|
| 3,857,541 | A | 12/1974 | Clark |
| 8,038,119 | B2 | 10/2011 | Bachmaier et al. |
| 2014/0183118 | A1 | 7/2014 | Marks |
| 2018/0023725 | A1 | 1/2018 | McEvoy et al. |

FOREIGN PATENT DOCUMENTS

| | | |
|---|---|---|
| FR | 2635361 A1 | 2/1990 |
| GB | 908417 A | 10/1962 |
| JP | H0874330 A | 3/1996 |

OTHER PUBLICATIONS

European Search Report for Application No. 18461542.5, dated Sep. 4, 2018, 8 pages.

*Primary Examiner* — Paul J Gray
(74) *Attorney, Agent, or Firm* — Cantor Colburn LLP

(57) ABSTRACT

A valve assembly includes a valve housing having a bore formed therein. The bore has an axis A and comprises a circumferentially extending groove formed at an end portion. An axially outer wall of the groove includes at least two circumferentially spaced radially inwardly extending retaining elements defining an axial slot therebetween. An end cap is received in the end portion of the bore and closes the end of the bore. The end cap includes a retaining portion that includes at least one radially outwardly extending retaining element which is shaped to be insertable through the axial slot into the groove and rotatable therein to a retaining position in which the radially outwardly extending retaining element aligns with one of the radially inwardly extending retaining elements to prevent axial withdrawal of the end cap from the bore.

15 Claims, 7 Drawing Sheets

VALVES

FOREIGN PRIORITY

This application claims priority to European Patent Application No. 18461542.5 filed Mar. 29, 2018, the entire contents of which is incorporated herein by reference.

TECHNICAL FIELD

The present disclosure relates to spool valves, for example servovalves, which may include a spool element which is movable under hydraulic pressure.

BACKGROUND

Spool valves, for example servovalves, may comprise a valve bore in which is mounted a reciprocating spool. This spool is moved under hydraulic pressure so as to open or close various ports in the valve bore. The end positions of the spool need to be precisely adjusted. This is achieved during assembly of the valve by end caps which are mounted in the ends of the valve bore. The caps are retained in the valve bore by means of endplates which are typically bolted to the valve housing by two or more bolts. Such a procedure may be costly and time consuming. Moreover, the caps are subject to high pressures in use, meaning that the end plates may be quite substantial and therefore add considerable weight to the valve.

SUMMARY

From a first aspect the disclosure provides a valve assembly comprising a valve housing having a bore formed therein. The bore has an axis A and comprises a circumferentially extending groove formed therein at an end portion thereof. An axially outer wall of the groove comprises at least two circumferentially spaced radially inwardly extending retaining elements defining an axially extending slot therebetween. The valve assembly further comprises an end cap received in the end portion of the bore and closing the end of the bore. The end cap comprises a retaining portion comprising at least one radially outwardly extending retaining element which is shaped so as to be insertable through the axially extending slot into the groove and rotatable therein to a retaining position in which the radially outwardly extending retaining element aligns with one of the radially inwardly extending retaining elements to prevent axial withdrawal of the end cap from the bore. The valve assembly further comprises an anti-rotation element insertable axially into the axial slot after the end cap has been rotated to its retaining position to prevent rotation of the end cap from its retaining position to a position in which it may be withdrawn axially from the bore and a locking element preventing withdrawal of the anti-rotation element from the axially extending slot.

The axially outer wall of the groove may comprise a plurality of radially inwardly extending retaining elements defining a plurality of axially extending slots therebetween. Optionally, the axially extending slots are circumferentially equi-spaced about the axis of the bore.

The retaining portion of the end cap may comprise a plurality of radially outwardly extending retaining elements. Optionally the radially outwardly extending retaining elements are circumferentially equi-spaced about the bore axis.

The number of radially outwardly extending retaining elements may be equal to the number of axial slots.

The locking element may be a separate element from the end cap or the anti-rotation element.

The anti-rotation element may comprise a base portion with at least one blocking element projecting axially therefrom for engagement in an at least one axially extending slot.

The anti-rotation element may comprise a plurality of blocking elements, each blocking element received within a respective axially extending slot.

The base portion may be a ring and the at least one blocking element may project axially from the ring.

The base portion may further comprises a bar extending diametrically across the ring. A head portion of the end cap may comprise a slot extending thereacross for receiving the bar.

The locking element may be mounted in the head portion of the end cap and extend across the bar preventing its removal from the slot.

The head portion of the end cap may comprise opposed aligned bores opening into the slot from opposite sides thereof. The locking element may extend through the bores and across the bar to prevent its removal from the slot.

The locking element may be a wire.

The anti-rotation element may be made from a plastics material.

The valve assembly may be a servovalve assembly, the bore mounting a spool.

The disclosure also provides a method of capping a bore in a valve housing having a bore formed therein, the bore comprising a circumferentially extending groove formed therein at an end portion thereof, an axially outer wall of the groove (144) comprising at least two radially inwardly extending retaining elements defining an axial slot therebetween. The method comprises aligning an at least one radially outwardly extending retaining element of an end cap with the at least one axial slot, the end cap to be received in the end portion of the bore, for closing the end of the bore, the end cap comprising a retaining portion comprising the at least one radially outwardly extending retaining element which is dimensioned so as to be insertable through the at least one axial slot and rotatable therein to a retaining position in which the at least one radially outwardly extending retaining element aligns with one of the radially inwardly extending retaining elements to prevent axial withdrawal of the end cap from the bore. The method further comprises inserting the end cap into the bore such that the at least one radially outwardly extending retaining element of the end cap passes through the at least one axial slot into the circumferentially extending groove and rotating the end cap relative to the valve housing such that the at least one radially outwardly extending retaining element of the end cap circumferentially aligns with one of radially inwardly extending retaining elements of the valve housing to prevent axial withdrawal of the end cap from the bore. The method further comprises then inserting an anti-rotation element into the at least one axial slot such that it prevents rotation of the end cap, the anti-rotation, and locking the anti-rotation element in position.

BRIEF DESCRIPTION OF DRAWINGS

An embodiment of this disclosure will now be described, by way of example only with reference to the accompanying figures in which.

DETAILED DESCRIPTION

Figure 1:
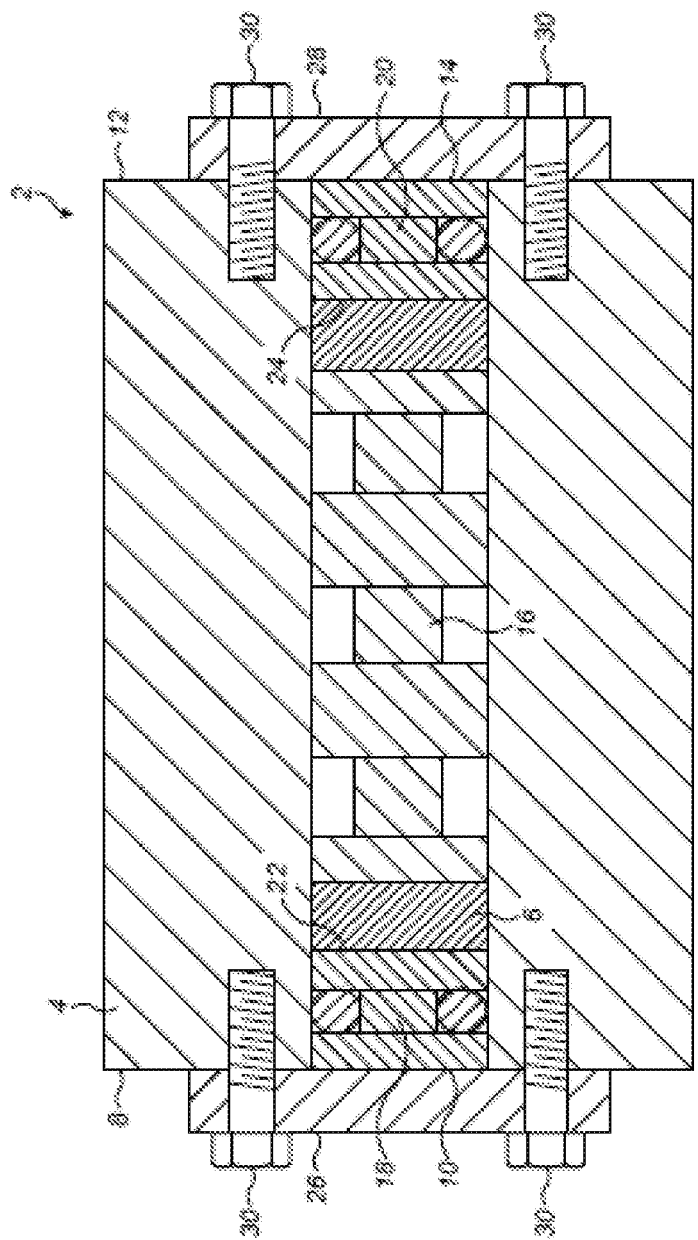
FIG. 1 shows a schematic representation of a prior art servovalve having a spool.

With reference to FIG. 1, there is shown, schematically, a typical hydraulic 2-stage servovalve 2. The servovalve 2 comprises a servovalve housing 4 having a spool bore 6 formed therethrough from a first surface 8 at a first end 10 to a second surface 12 at a second end 14. A reciprocating spool 16 is received within the bore 6 and is moved within the bore by means of hydraulic fluid admitted into the bore 6. The bore 6 is closed at either end by end caps 18, 20. The end caps 18, 20 typically have ground surfaces 22, 24 which act as stop surfaces for the spool 16. The end caps 18, 20 are retained in the bore by respective endplates 26, 28 which are typically fastened to the valve housing 4 by bolts 30.

As discussed above, due to high pressures experienced by the end caps 18, 20 in use, the endplates 26, 28 must be substantial, which may add weight to the valve 2. This may be disadvantageous in certain applications, for example in aircraft applications. Also, the assembly and disassembly of the endplates 26, 28 may be time-consuming due to the presence of multiple bolts 30.

An alternative valve assembly in accordance with this disclosure and which may mitigate the above problems is described with reference to FIGS. 2 to 13. In the disclosed valve assembly in accordance with the disclosure, the endplates of the prior art arrangement have been dispensed with and the end caps are retained in the valve housing in a different manner.

Figure 2:
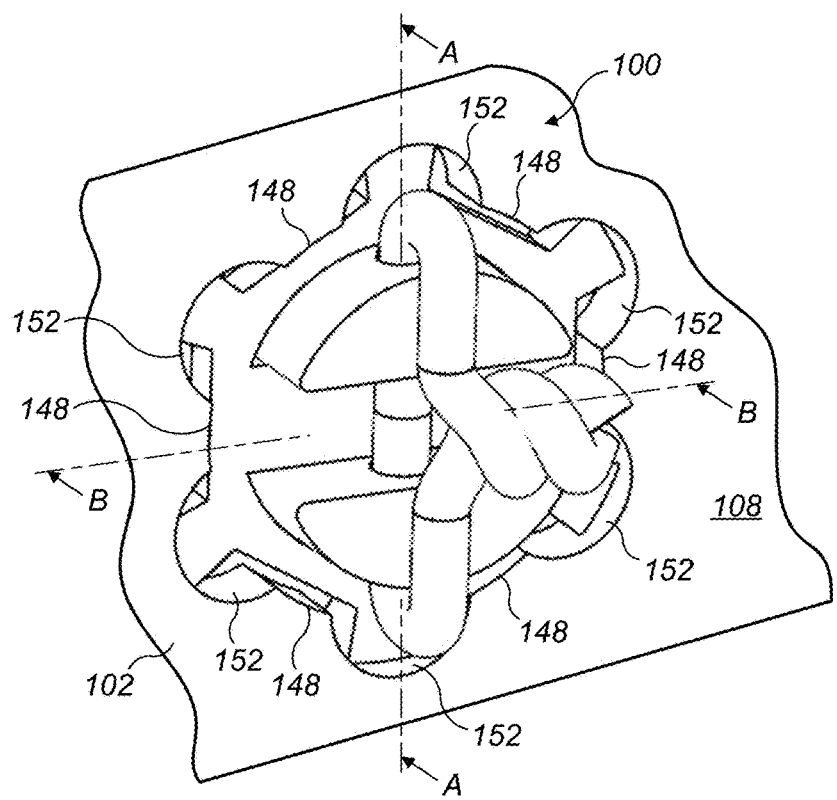
FIG. 2 shows a perspective view of a part of a servovalve in accordance with this disclosure.
Figure 3:
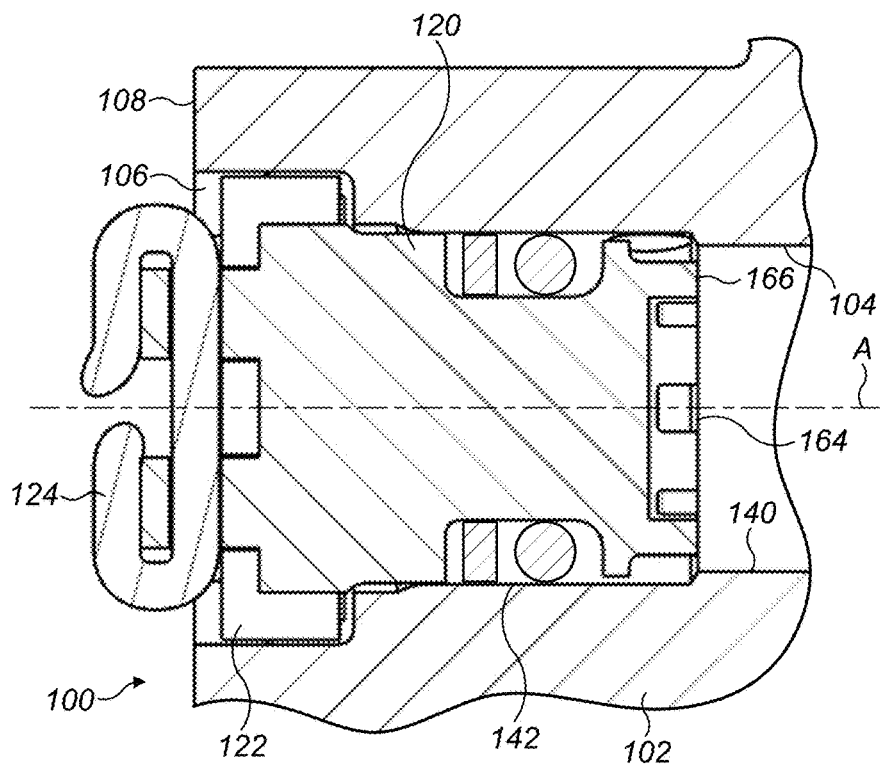
FIG. 3 shows a cross-sectional view along the line A-A of FIG. 2.
Figure 4:
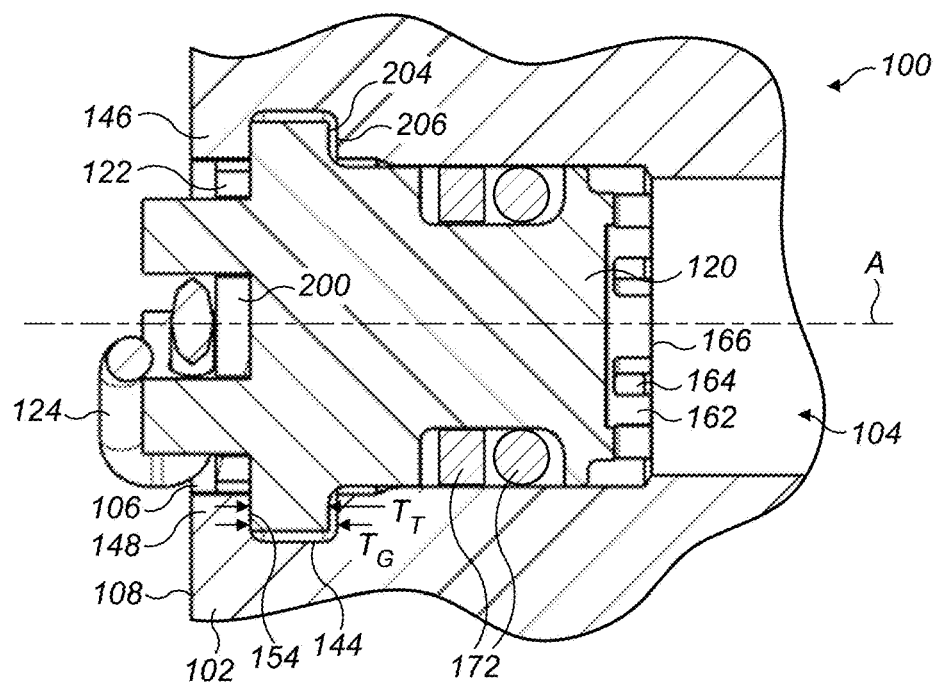
FIG. 4 shows a cross-sectional view along line B-B of FIG. 2.

Referring firstly to FIGS. 2 to 4, a servovalve 100 comprises a servovalve housing 102 having a spool-receiving bore 104 extending therethrough along a bore axis X from a first end 106 at a first body surface 108 to a second end at a second body surface (not shown), similarly to the prior art servovalve discussed above. Typically the servovalve housing 102 is made from metal due to the high pressures exerted in the housing 102.

As will be described in further detail below, an end cap 120 is received in each end of the bore 104 and retained in position by means of an anti-rotation element 122 and a locking element 124. In use, the end cap 120 may act as a stop for a spool element arranged within the bore 104.

Figure 5:
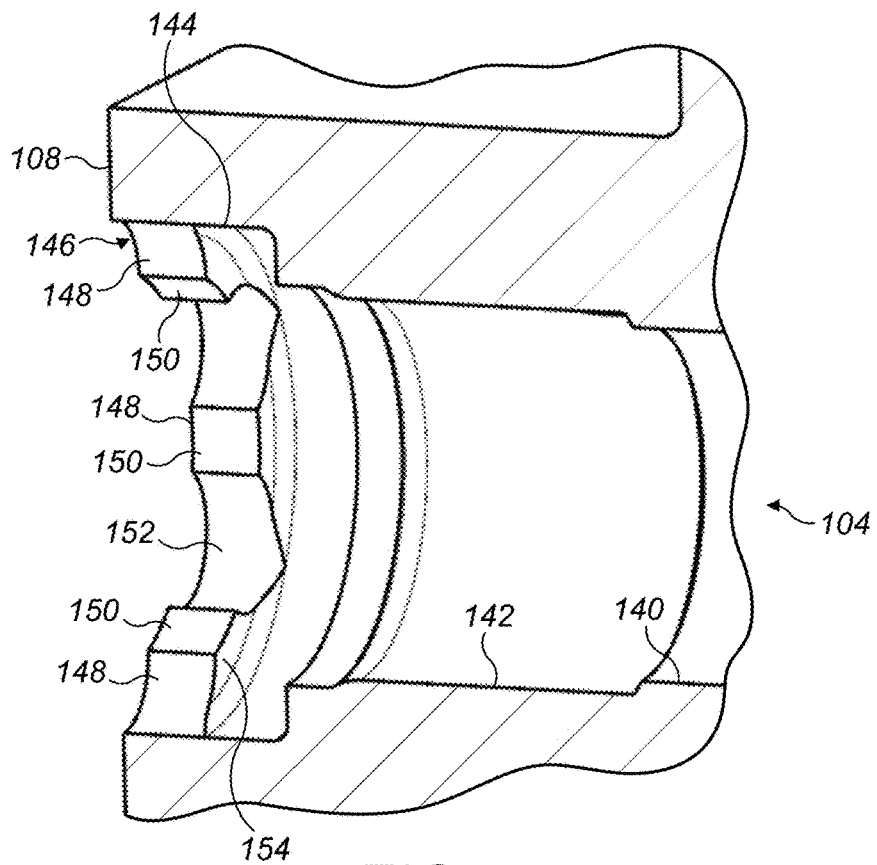
FIG. 5 shows a perspective sectional view of the end region of the bore of the servovalve assembly illustrated in FIGS. 2 to 4.

With reference now particularly to FIGS. 2, 3 and 5, the bore 104 comprises a spool receiving portion 140, and an end cap receiving portion 142. The end cap receiving portion 142 is formed with a circumferentially extending groove 144 spaced axially from the first body surface 108. The circumferentially extending groove 144 may in certain embodiments be machined into the bore 104. The circumferentially extending groove 144 is separated from the first body surface 108 by an axially outer wall 146 which comprises a plurality of radially inwardly extending end cap retaining elements 148. In this embodiment, there are six end cap retaining elements 148 provided. However, a larger or smaller number of end cap retaining elements 148 may be provided. Each end cap retaining element 148 resembles a tooth with an arcuate radially inner edge 150.

A plurality of axial slots 152 are formed between adjacent end cap retaining elements 148. In this embodiment, therefore, there are also six axial slots 150. By axial is meant that the slots 152 extend in an axial direction. While illustrated as being parallel to the axis X of the value bore 104, they may be formed at an angle thereto in other embodiments.

The axial slots 152 extend from the first body surface 108 into the circumferential groove 144. In this embodiment, the axial slots 152 are formed with a circular arcuate profile. This may facilitate manufacture of the slots 152, for example by drilling. Thus, as can be seen for example from FIG. 2, in this embodiment, the first end 106 of the bore 104 has a scalloped appearance at the first body surface 108. Of course other slot profiles are possible within the scope of the disclosure.

As can be seen from FIG. 4 the axially inner surface 154 of the axially outer groove wall 146 is perpendicular to the bore axis X. This will provide an accurate end location for the end cap 120.

Figure 6:
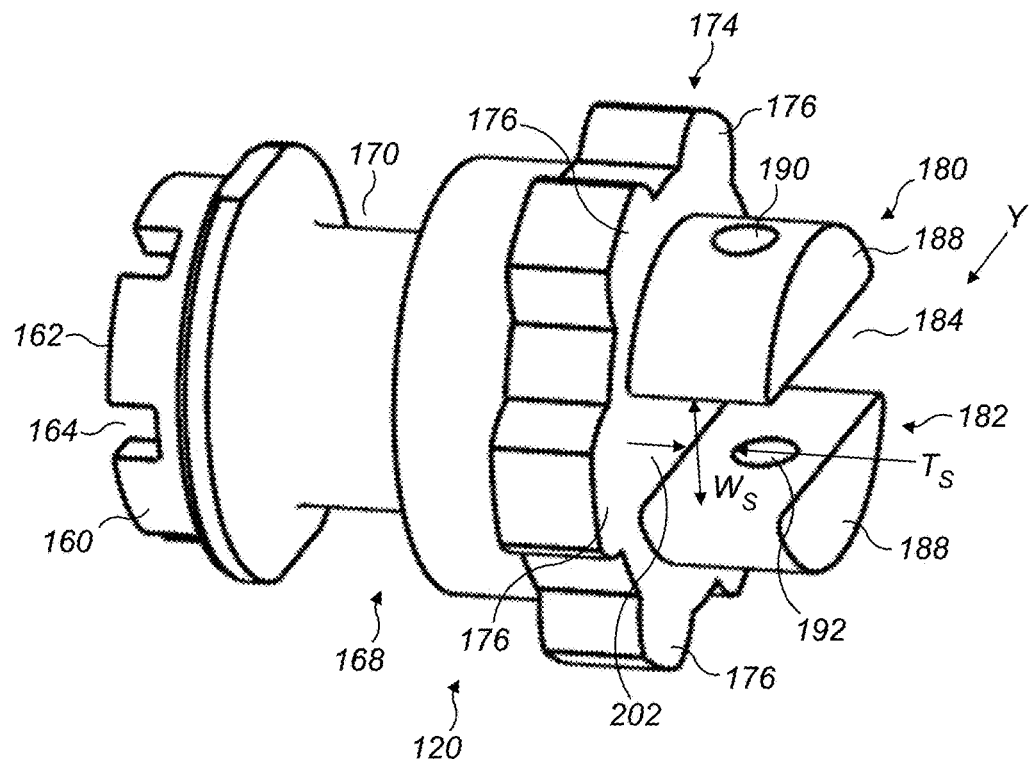
FIG. 6 shows a perspective view of the end cap of the servovalve assembly illustrated in FIGS. 2 to 4.

Turning now to the end cap 120, this is shown most clearly in FIGS. 3, 4 and 6.

The end cap 120, which may be made from a metallic material to resist the pressures exerted in the servovalve 100, comprises a first end portion 160 comprising a series of axially projecting teeth 162 with circumferential gaps 164 formed between the teeth 162. The axially facing surfaces 166 of the teeth 162 in use may engage the spool of the valve 100 to limit its axial movement. The gaps 164 allow circulation of fluid behind the end of the spool when it is in the limit position so as to allow pressure to be built up behind the spool to facilitate its movement away from the limit position, as is known in the art.

The end cap 120 further comprises a body portion 168 which is received within the end cap receiving portion 142 of the valve housing bore 104. The body portion 168 comprises a circumferential groove 170 which in use, receives one or more sealing elements 172 such as O-rings or other sealing rings, illustrated schematically in FIGS. 2 and 3, for preventing egress of hydraulic fluid from the bore 104.

The end cap 120 also comprises a retaining portion 174. The retaining portion 174 comprises a plurality of radially outwardly extending retaining elements or teeth 176. In this embodiment, there are six teeth 176, i.e. the same number of teeth 176 as axial slots 152 in the valve housing 104. The retaining teeth 176 are shaped and spaced such that they may be inserted into the axial slots 152. In this embodiment, the retaining teeth 176 are somewhat like gear teeth in shape.

The retaining teeth 176 have an axial length TT (see FIG. 4) which is less than the axial length TG of the circumferential groove 144 in the valve bore 104 such that the retaining teeth 176 can be received within the circumferential groove 144. There should be sufficient clearance between the retaining teeth 176 and the walls of the circumferential groove 144 to allow the end cap 120 to be rotated when the retaining teeth 176 are received in the groove 144.

The end cap 120 also comprises a head portion 180 extending axially away from the retaining portion 174. The head portion 180 comprises a cylindrical projection 182 having a slot 184 formed across a diameter thereof to define two segments 186, 188. The segments 186, 188 have aligned bores 190, 192 formed therethrough, the bores 190, 192 opening into the slot 184. In this embodiment, the bores 190, 192 are formed across a diameter of the head portion 180 perpendicular to the axis Y of the slot 184. As will be described further below, the bores 190, 192 will receive the locking element 124.

Figure 7:
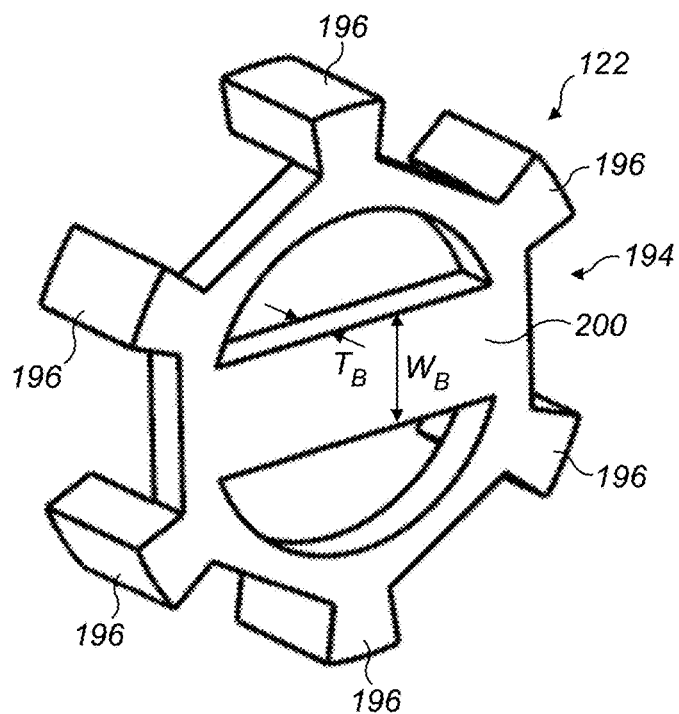
FIG. 7 shows a perspective view of the anti-rotation element of the servovalve assembly illustrated in FIGS. 2 to 4.

Turning now to the anti-rotation element 122, this can be seen most clearly in FIG. 7.

In this embodiment, the anti-rotation element 122 comprises a ring-shaped base portion 194 and a plurality of blocking elements or teeth 196 projecting axially therefrom. In this embodiment, there are six blocking teeth 196, i.e. the same number of blocking teeth 196 as the number of axial slots 152 in the valve housing 104. However, in other embodiments, the number of blocking teeth 196 may be higher or lower and there may be fewer blocking teeth 196 than the number of axial slots 152.

Figure 13:
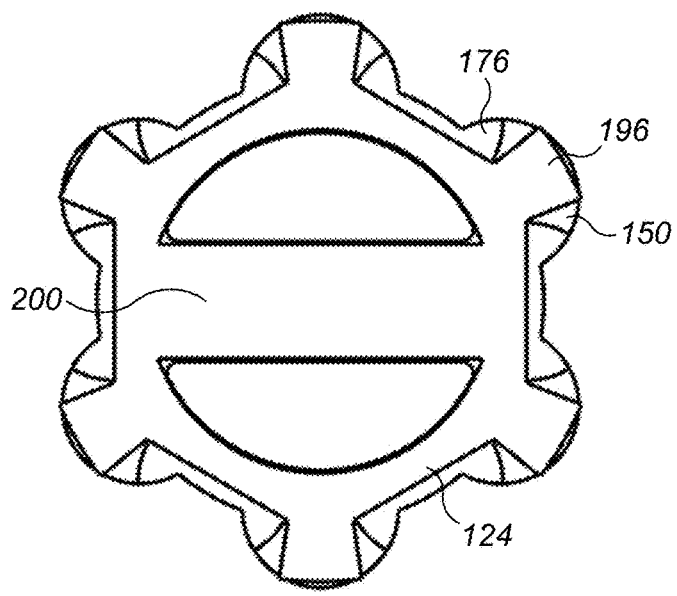
FIG. 13 shows a view along arrow E of FIG. 12.

As can be seen for example from FIG. 13, the blocking teeth 196 are arranged circumferentially around the base portion 194 at the same circumferential spacing as the axial slots 152 such that the blocking teeth 196 may be aligned therewith. The cross sectional shape of the blocking teeth 196 is such that once inserted into the axial slots 152, the anti-rotation member 122 will not be able to rotate, or rotate to any significant extent. Also, the cross sectional shape of the blocking teeth 196 is such that once inserted into the axial slots 152, the blocking teeth 196 can sit between adjacent cap retaining elements 176 so as to prevent their rotational movement within the groove 144 of the valve housing 104. The blocking teeth 196 may therefore, in some embodiments have a tight or press fit within the axial slots 152.

As the blocking teeth 196 will not be subjected to the high pressures experienced in the valve housing 102, the blocking teeth 196 (and the whole anti-rotation element 122) may therefore be made from a less strong material, for example a plastics material such as PEEK. Of course other plastics materials may be used. In some embodiments, metals, for example Aluminium, may be used.

The anti-rotation element 122 also comprises a bar 200 which extends diametrically across the base portion 194. The bar 200 has a width WB which is less than the width WS of the slot 184 in the head portion 180 of the end cap 120 so that the bar 200 may be received within the slot 184 as can be seen for example from FIG. 2. In addition, the thickness TB of the bar 200 is less than the distance TS between the bores 190, 192 and the axially outer face 202 of the retaining portion 174 of the end cap 120 as shown in FIG. 6. This will allow the locking element 124 to be inserted through the bores 190, 192 to prevent withdrawal of the anti-rotation element 122 from the end cap 120.

In this embodiment, the locking element 124 is a wire which can be threaded through the bores 190, 192 and its ends twisted to hold the locking element 124 in position. This is of course just one example of locking element 124. In other embodiments, the locking element may be a pin, clip or similar element. In other embodiments, the locking element may be formed as a part of the anti-rotation element 122 or the end cap 120 rather than as a completely separate element. In such embodiments, the locking may be effected for example by deforming a locking portion of either element to lock the two parts together. In another embodiment, one or other of the components may be formed with a clip or the like which engages with the other as the anti-rotation element 122 is mounted to the end cap 120.

Now that the individual components of the valve assembly 100 have been described, location of the end cap 120 in the bore 104 will now be described with reference to FIGS. 2 and 8 to 13.

Figure 8:
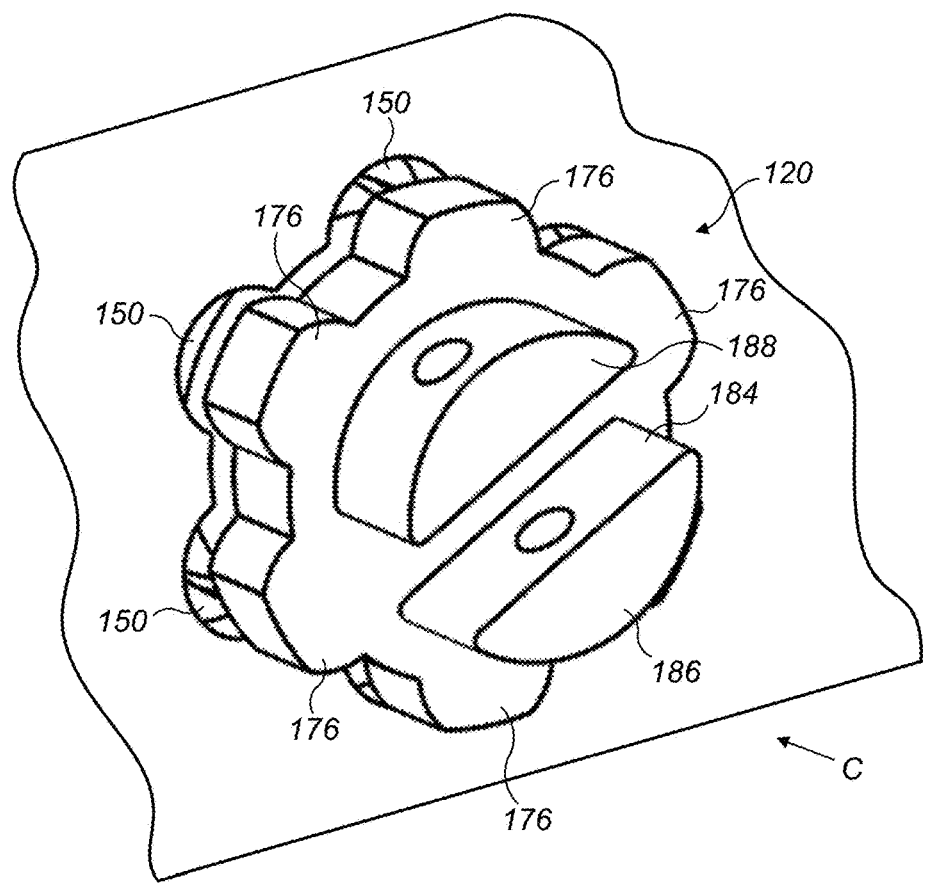
FIG. 8 shows a perspective view of a first stage in the mounting of the end cap in the servovalve bore.
Figure 9:
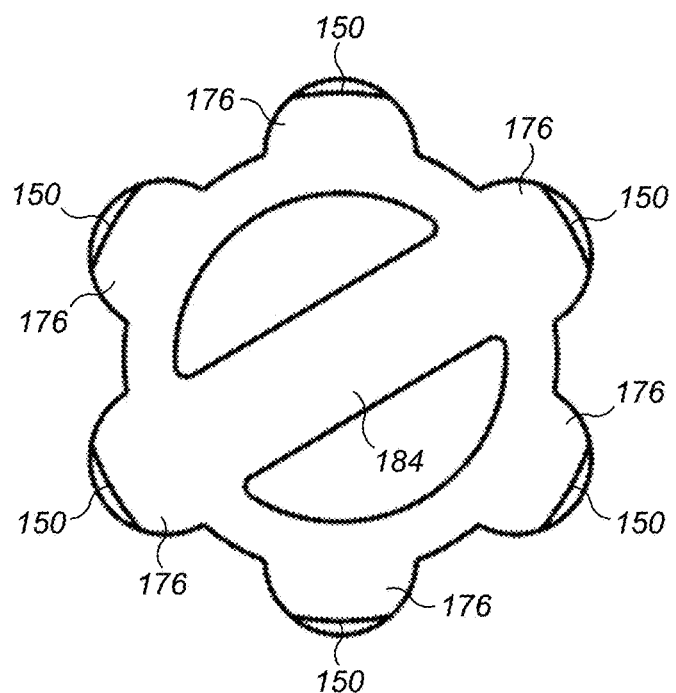
FIG. 9 shows a view along arrow C of FIG. 8.

As a first step in the assembly procedure, the end cap 120, with any sealing elements 172 mounted thereon, is inserted into the first end 106 of the bore 104. To permit this, the cap retaining elements 176 on the end cap 120 are circumferentially aligned with the axial slots 152 in the valve housing 102, as shown in FIGS. 8 and 9. As can be seen particularly from FIG. 9, in this embodiment the cap retaining elements of the cap 120 have an essentially complementary shape to that of the axial slots 150, although that is not essential.

The end cap 120 may then be inserted axially into the bore 104. The axial movement of the end cap 120 into the bore 104 may be limited for example by the engagement of an axially facing surface 204 of the end cap 120 with a surface or edge of the groove 144 in the valve housing 102.

Figure 10:
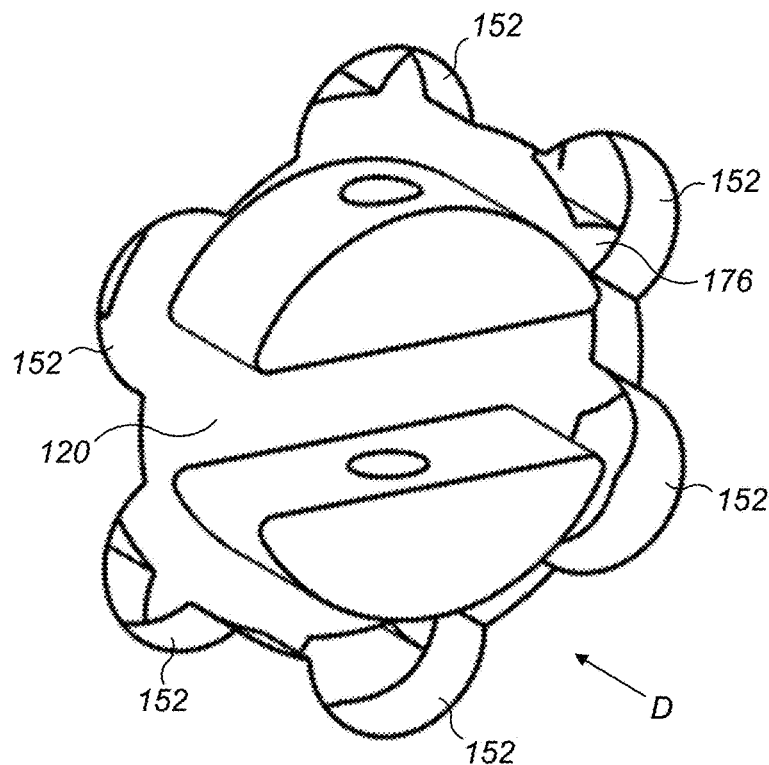
FIG. 10 shows a perspective view of a second stage in the mounting of the end cap in the servovalve bore.
Figure 11:
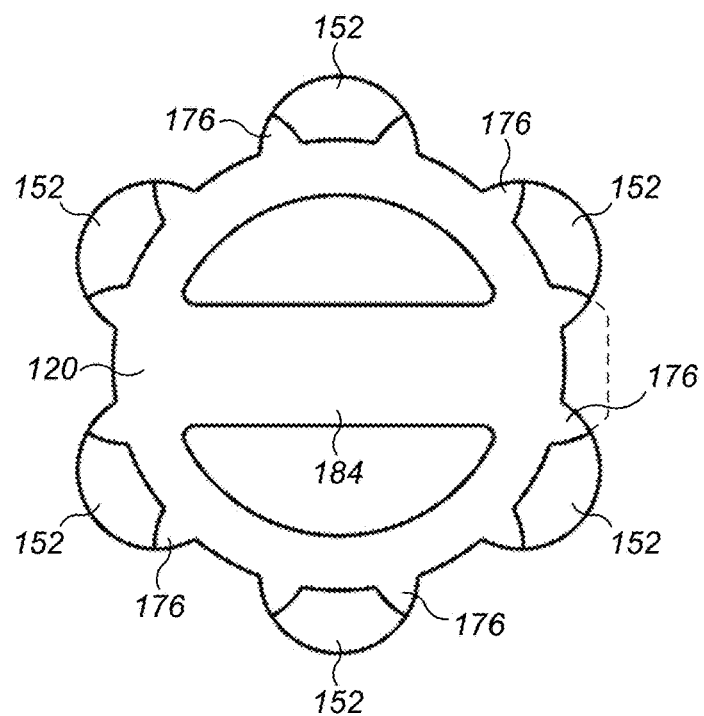
FIG. 11 shows a view along arrow D of FIG. 10.

Once the end cap 120 is inserted, it is rotated such that the cap retaining elements 176 move into alignment with the cap retaining elements 148 of the valve housing 102. This position is illustrated in FIGS. 10 and 11. As can be seen, when the end cap 120 is rotated to this position, the axial slots 152 are substantially opened once more for reception of the anti-rotation element 122.

Figure 12:
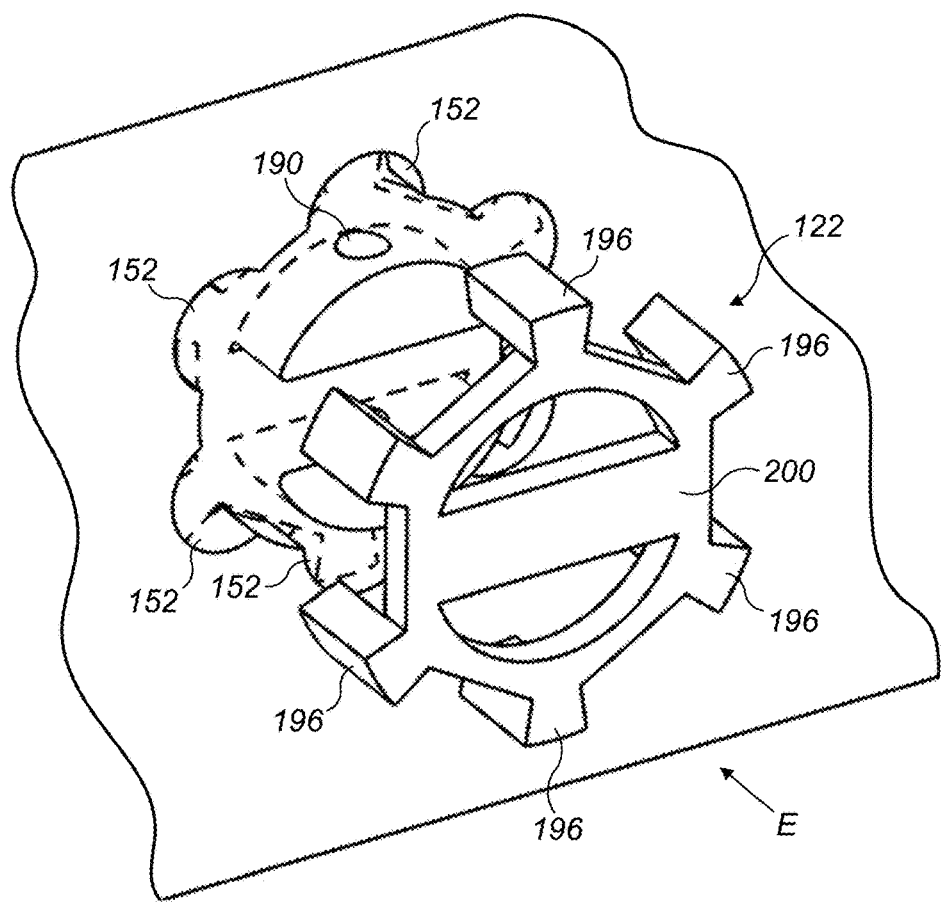
FIG. 12 shows a perspective view of a second stage in the mounting of the end cap in the servovalve bore.

The anti-rotation element 122 may then be aligned as shown in FIGS. 12 and 13 with the blocking teeth 196 circumferentially aligned with the axial slots 152 and the gap between the cap retaining elements 176 of the cap 120. The blocking teeth 196 of the anti-rotation element 122 may then be moved into the axial slots 152, such that the anti-rotation element 122 assumes the position illustrated in dotted lines in FIG. 12. It will be seen that in this position, the bar 200 of the anti-rotation element 122 is received within the slot 184 in the head portion of the end cap 120, but that the bores 190, 192 in the head portion 180 are exposed. Also, the blocking teeth 196 will axially overlap the cap retaining elements 176 of the end cap 120. As the anti-rotation element 122 cannot rotate due to the interaction of the blocking teeth 196 with the axial slots 152, the end cap 120 is blocked from rotation by engagement of the cap retaining elements 176 with the blocking teeth 196.

As a final step, the locking element, in this embodiment the wire 124, is inserted through the bores 190, 192 in the head portion 180 of the end cap 120 and its ends twisted to secure the locking element 124 in position. This will prevent the anti-rotation element 122 from being removed from the end cap 120.

As discussed above, the end cap 120 may act as an end stop for a spool within the valve bore 104. The engagement of the external end face 202 of the end cap 120 with the axially outer wall 142 of the circumferential groove 144 will provide an accurate location for the end cap 120 when it is subjected to hydraulic pressure from within the bore 104.

Should it be necessary to replace the end cap 120 during use, the locking element 124 may be removed, allowing the anti-rotation element 122 to be withdrawn and the end cap 120 then to be rotated to a position in which its cap retaining elements 176 may be withdrawn through the axial slots 152.

The embodiments described above may have certain advantages. Firstly, they avoid the need for heavy end plates for retaining the end caps 120, which may be advantageous in certain applications, for example in aircraft. Also, the use of multiple bolts may be avoided by using a simple locking element 124.

It will also be appreciated that the above described embodiment is only exemplary and that modifications may be made thereto without departing from the scope of the disclosure. Some of those modifications are discussed in the description, but others will be readily apparent to the skilled person. For example, while the embodiment has been described in terms of a servovalve, the disclosure can be applied to any form of spool valve or indeed any valve in which a valve bore requires closing. Also, while multiple blocking elements 196 are disclosed, in certain embodiments, a single blocking element 196 may be sufficient.

Also, as discussed above, the locking element 124 may be a part of the anti-rotation element 122 or end cap 120, for example. In certain embodiments, the locking element 124 may simply be a part of one of the components which interferes with the other to prevent removal of the anti-rotation element 122.

The invention claimed is:

1. A valve assembly comprising:
a valve housing having a bore formed therein, the bore having an axis A and comprising a circumferentially extending groove formed therein at an end portion thereof, an axially outer wall of said groove comprising at least two circumferentially spaced radially inwardly extending retaining elements defining an axial slot therebetween;
an end cap received in the end portion of the bore and closing the end of the bore, the end cap comprising a retaining portion comprising at least one radially outwardly extending retaining element which is shaped so as to be insertable through the axial slot into the groove and rotatable therein to a retaining position in which the radially outwardly extending retaining element aligns with one of the radially inwardly extending retaining elements to prevent axial withdrawal of the end cap from the bore;
an anti-rotation element insertable axially into the axial slot after the end cap has been rotated to its retaining position to prevent rotation of the end cap from its retaining position to a position in which it may be withdrawn axially from the bore; and
a locking element preventing withdrawal of the anti-rotation element from the axial slot.

2. The valve assembly as claimed in claim 1, wherein the axially outer wall of the groove comprises a plurality of radially inwardly extending retaining elements defining a plurality of axial slots therebetween, wherein the axial slots are circumferentially equi-spaced about the axis A of the bore.

3. The valve assembly as claimed in claim 2, wherein the retaining portion of the end cap comprises a plurality of radially outwardly extending retaining elements, wherein, the radially outwardly extending retaining elements are circumferentially equi-spaced about the bore axis (A).

4. The valve assembly as claimed in claim 3, wherein the number of radially outwardly extending retaining elements is equal to the number of axial slots.

5. The valve assembly as claimed in claim 1, wherein the locking element is a separate element from the end cap or the anti-rotation element.

6. The valve assembly as claimed in claim 1, wherein the anti-rotation element comprises a base portion with at least one blocking element projecting axially therefrom for engagement in an at least one axial slot.

7. The valve assembly as claimed in claim 6, wherein the anti-rotation element comprises a plurality of blocking elements, each blocking element received within a respective axial slot.

8. The valve assembly as claimed in claim 6, wherein the base portion is a ring and the at least one blocking element projects axially from the ring.

9. The valve assembly as claimed in claim 8, wherein base portion further comprises a bar extending diametrically across the ring, and wherein a head portion of the end cap comprises a slot extending thereacross for receiving the bar.

10. The valve assembly as claimed in claim 9, wherein the locking element is mounted in the head portion of the end cap and extends across the bar preventing its removal from the slot.

11. The valve assembly as claimed in claim 10, wherein the head portion of the end cap comprises opposed aligned bores opening into the slot from opposite sides thereof, the locking element extending through the bores and across the bar to prevent its removal from the slot.

12. The valve assembly as claimed in claim 1, wherein the locking element is a wire.

13. The valve assembly as claimed in any claim 1, wherein the anti-rotation element is made from a plastics material.

14. The valve assembly as claimed in claim 1, wherein the valve assembly is a servovalve assembly, the bore mounting a spool.

15. A method of capping a bore in a valve housing, the valve housing having a bore formed therein, the bore comprising a circumferentially extending groove formed therein at an end portion thereof, an axially outer wall of the groove comprising at least two radially inwardly extending retaining elements defining an axial slot therebetween; the method comprising:
aligning an at least one radially outwardly extending retaining element of an end cap with the at least one axial slot, the end cap to be received in the end portion of the bore, for closing the end of the bore, the end cap comprising a retaining portion comprising the at least one radially outwardly extending retaining element which is dimensioned so as to be insertable through the at least one axial slot into the circumferentially extending groove and rotatable therein to a retaining position in which the at least one radially outwardly extending retaining element aligns with one of the radially inwardly extending retaining elements to prevent axial withdrawal of the end cap from the bore;
inserting the end cap into the bore such that the at least one radially outwardly extending retaining element of the end cap passes through the at least one axial slot into the circumferentially extending groove;
rotating the end cap relative to the valve housing such that the at least one radially outwardly extending retaining element of the end cap circumferentially aligns with one of radially inwardly extending retaining elements of the valve housing to prevent axial withdrawal of the end cap from the bore;
inserting an anti-rotation element into the at least one axial slot such that it prevents rotation of the end cap, the anti-rotation element;
and
locking the anti-rotation element in position.

* * * * *